(12) United States Patent
Dieckhoff et al.

(10) Patent No.: US 9,879,751 B2
(45) Date of Patent: Jan. 30, 2018

(54) TORSIONAL VIBRATION DAMPING ARRANGEMENT FOR THE POWERTRAIN OF A VEHICLE

(71) Applicant: ZF FRIEDRICHSHAFEN AG, Friedrichshafen (DE)

(72) Inventors: Tobias Dieckhoff, Würzburg (DE); Thomas Dögel, Nüdlingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 68 days.

(21) Appl. No.: 14/910,989

(22) PCT Filed: Jul. 7, 2014

(86) PCT No.: PCT/EP2014/064398
§ 371 (c)(1),
(2) Date: Feb. 8, 2016

(87) PCT Pub. No.: WO2015/018576
PCT Pub. Date: Feb. 12, 2015

(65) Prior Publication Data
US 2016/0186834 A1    Jun. 30, 2016

(30) Foreign Application Priority Data

Aug. 9, 2013   (DE) .................. 10 2013 215 726

(51) Int. Cl.
*F16F 15/12*  (2006.01)
*F16F 15/131*  (2006.01)
(Continued)

(52) U.S. Cl.
CPC .... *F16F 15/1206* (2013.01); *F16F 15/13157* (2013.01); *F16H 45/02* (2013.01); *F16H 57/082* (2013.01); *F16H 2045/0268* (2013.01)

(58) Field of Classification Search
CPC ............ F16F 15/1206; F16F 15/13157; F16H 2045/0268; F16H 57/082
See application file for complete search history.

(56) References Cited

U.S. PATENT DOCUMENTS

| | | | | |
|---|---|---|---|---|
| 2015/0260256 A1* | 9/2015 | Lorenz | ................ | F16F 15/1206 475/151 |
| 2015/0377321 A1* | 12/2015 | Dieckhoff | ......... | F16F 15/13157 475/35 |
| 2016/0160957 A1* | 6/2016 | Dieckhoff | ........... | F16F 15/1206 192/3.28 |

FOREIGN PATENT DOCUMENTS

| | | |
|---|---|---|
| DE | 103 03 894 | 9/2004 |
| DE | 10 2009 035 914 | 3/2010 |

(Continued)

*Primary Examiner* — Sherry L Estremsky
(74) *Attorney, Agent, or Firm* — Cozen O'Connor

(57) ABSTRACT

A torsional vibration damping arrangement has parallel first torque and second torque transmission paths that proceed from an input region, a coupling arrangement that communicates with an output region for superposing the torques conducted via the two paths, and a phase shifter arrangement for generating a phase shift of rotational irregularities conducted via the first torque transmission path relative to rotational irregularities of the second torque transmission path. The planet gear carrier has at least one base element with a first planet gear bearing location and a second planet gear bearing location. The first planet gear bearing location is positioned at the base element on a first pitch circle diameter and the second planet gear bearing location is positioned at the base element on a second pitch circle diameter, and the first pitch circle diameter and the second pitch circle diameter differ from one another.

11 Claims, 17 Drawing Sheets

(51) Int. Cl.
*F16H 45/02* (2006.01)
*F16H 57/08* (2006.01)

(56) References Cited

FOREIGN PATENT DOCUMENTS

| | | |
|---|---|---|
| DE | 10 2011 007 118 | 12/2011 |
| DE | 10 2013 205 787 | * 10/2013 |
| DE | 10 2014 212 825 | * 1/2016 |
| WO | WO 2014/012545 | 1/2014 |
| WO | WO 2014/095186 | 6/2014 |
| WO | WO 2015/010841 | * 1/2015 |

* cited by examiner

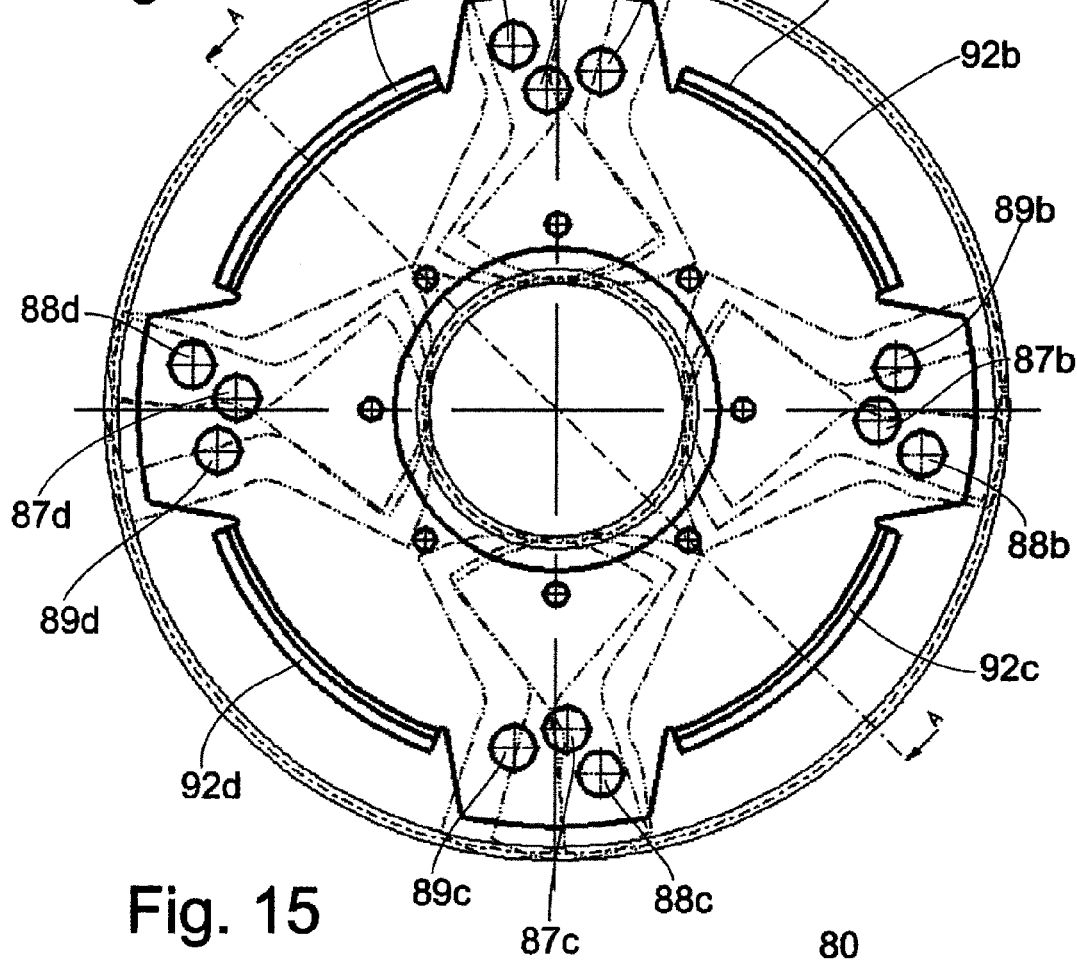

Fig. 16
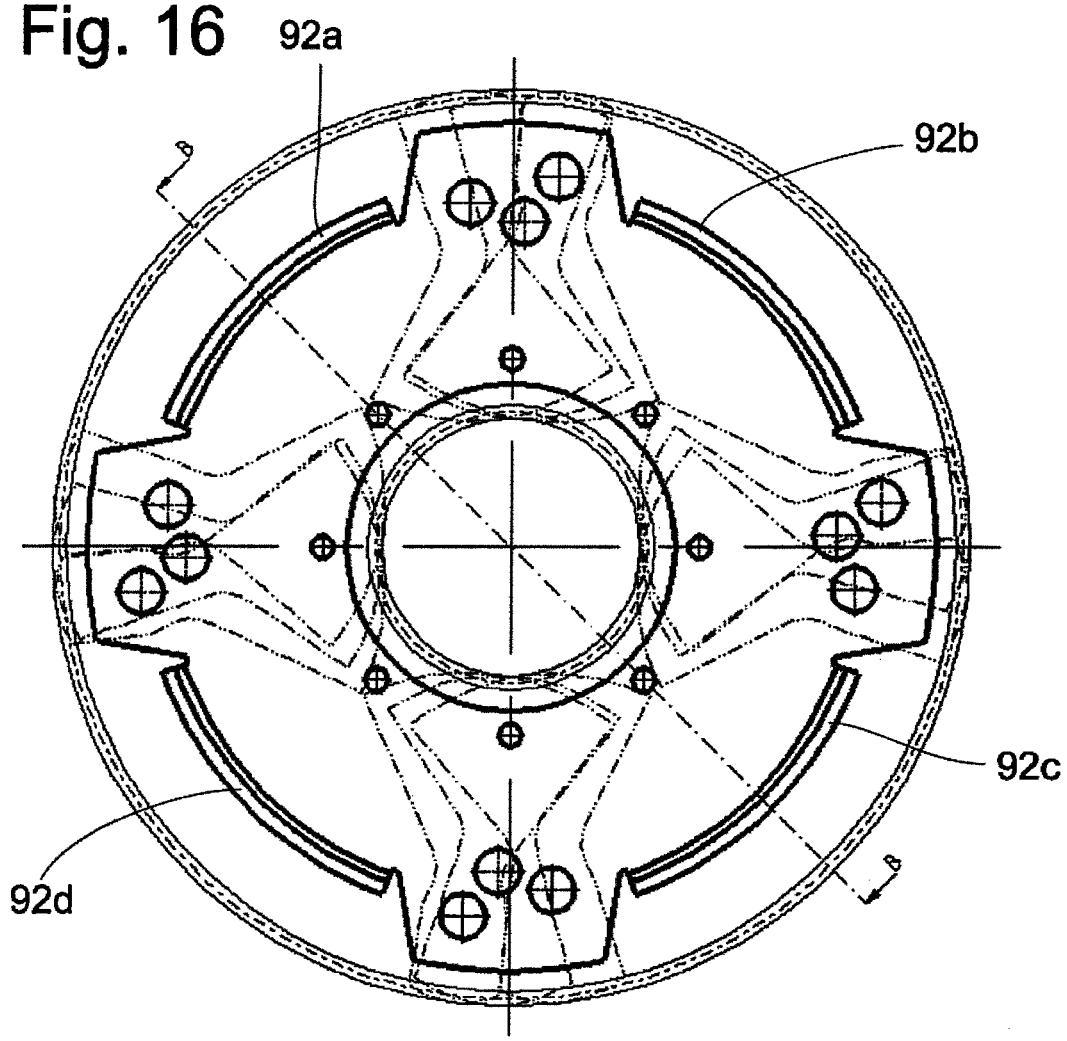
B-B
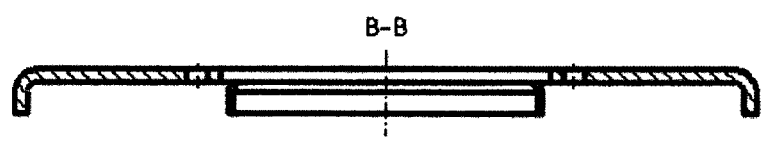
Fig. 17

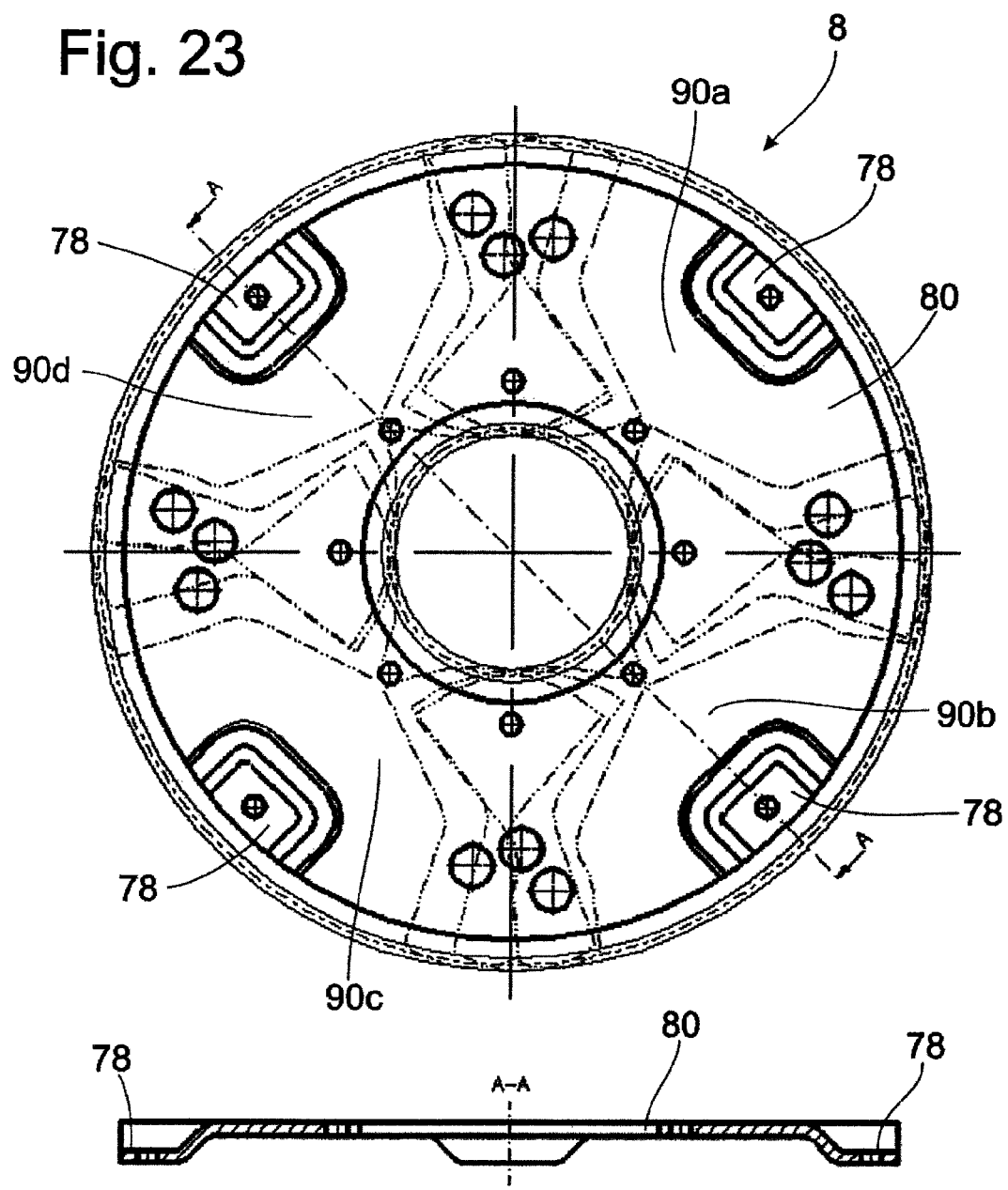

TORSIONAL VIBRATION DAMPING ARRANGEMENT FOR THE POWERTRAIN OF A VEHICLE

CROSS REFERENCE TO RELATED APPLICATIONS

This is a U.S. national stage of application No. PCT/EP2014/064398, filed on Jul. 7, 2014. Priority is claimed on German Application No. DE102013215726.6, filed Aug. 9, 2013, the content of which I incorporated herein by reference.

BACKGROUND OF THE INVENTION

1. Field of the Invention

The present invention relates to a torsional vibration damping arrangement for a powertrain of a vehicle, comprising an input region driven in rotation around an axis of rotation A and an output region, wherein there are provided between the input region and the output region a first torque transmission path and parallel thereto a second torque transmission path and a coupling arrangement for superposing the torques conducted via the torque transmission paths. A phase shifter arrangement is provided in the first torque transmission path for generating a phase shift of rotational irregularities conducted via the first torque transmission path relative to rotational irregularities conducted via the second torque transmission path.

2. Detailed Description of the Prior Art

A generic torsional vibration damping arrangement known from the German patent application DE 10 2011 007 118 A1 divides the torque introduced into an input region, for example through a crankshaft of a drive unit, into a torque component transmitted via a first torque transmission path and a torque component conducted via a second torque transmission path. Not only is there a static torque divided in this torque division, but also the vibrations and rotational irregularities generated by the periodically occurring ignitions in a drive unit are contained in the torque are also divided proportionately into the two torque transmission paths. The torque components transmitted via the two torque transmission paths are rejoined in a coupling arrangement constructed as a planetary gear set with a planet gear carrier having a planet gear and are then introduced as total torque into the output region, for example, a friction clutch or the like. In this respect, the transmission ratio in the planetary gear set plays a crucial role for adapting the overall system to different applications.

A phase shifter arrangement with an input element and an output element is provided in at least one of the torque transmission paths. This phase shifter arrangement function as a vibration damper, i.e., it is formed with a primary side and a secondary side that is rotatable with respect to the primary side through the compressibility of a spring arrangement. In particular when this vibration system passes into a supercritical state, i.e., when it is excited with vibrations exceeding the resonant frequency of the vibration system, a phase shift of up to 180° occurs. This means that at maximum phase displacement the vibration components proceeding from the vibration system are shifted in phase by 180° with respect to the vibration components received by the vibration system. Since the vibration components conducted via the other torque transmission path do not undergo a phase shift or, if so, a different phase shift, the vibration components contained in the unified torque components that are then shifted in phase with respect to one another are destructively superposed on one another such that, ideally, the total torque introduced into the output region is a static torque that contains essentially no vibration components.

SUMMARY OF THE INVENTION

It is the object of an embodiment of the present invention to further develop a torsional vibration damping arrangement having a planetary gear set such that it can be provided economically for different applications and, therefore, with different transmission ratios in the planetary gear set and such that as few component parts as possible need be changed for the respective application.

According to one embodiment of the invention a torsional vibration damping arrangement for a powertrain of a vehicle, comprises an input region to be driven in rotation around an axis of rotation A and an output region, wherein there are provided between the input region and the output region a first torque transmission path and, parallel thereto, a second torque transmission path, and a coupling arrangement for superposing the torques conducted via the two torque transmission paths, which coupling arrangement communicates with the output region, and wherein a phase shifter arrangement is provided in the first torque transmission path for generating a phase shift of rotational irregularities conducted via the first torque transmission path relative to rotational irregularities conducted via the second torque transmission path. The planet gear carrier comprises at least one base element with a first planet gear bearing location and a second planet gear bearing location, the first planet gear bearing location is positioned at the base element on a first pitch circle diameter and the second planet gear bearing location is positioned at the base element on a second pitch circle diameter, and the first pitch circle diameter and the second pitch circle diameter differ from one another.

It should be mentioned that the planetary gear set can be constructed with different shifting variants. In FIG. 1, the planetary gear set is installed in such a way that the rigid torque path coming from the crankshaft of an internal combustion engine is guided via a driving sun gear to the planetary gear set. The phase-shifted torque branch is guided via a driving ring gear to the planetary gear set. The driving sun gear and driving ring gear mesh with the planet gear, and the planet gear carrier forms the output. Accordingly, the combined torque is guided further through the planet gear carrier, for example, to a transmission input shaft.

However, the invention can also be used in shifting variants in which the planet gear carrier is fixedly connected to the rigid torque path with respect to relative rotation, the driving ring gear is fixedly connected to the phase-shifted torque path with respect to relative rotation, and a driven ring gear forms the output of the coupling arrangement.

The rigid torque path can also be fixedly connected to the driving ring gear with respect to relative rotation, the phase-shifted torque path can be fixedly connected to the driving sun gear with respect to relative rotation, and the planet gear carrier comprises the output of the coupling arrangement.

The invention will be described using the example of the shifting variant shown in FIG. 1. However, it is irrelevant whether the invention is connected in a shifting variant with a torque converter, as is described in the following, or whether a conventional shift transmission is connected to the output of the torsional vibration damping arrangement.

In the construction described by way of example referring to FIG. 1, the planet gear meshes with the driving ring gear and the driving sun gear, the driving ring gear is located radially outward of the planet gear, and the driving sun gear is located radially inward of the planet gear. One aspect of the invention is to change the transmission ratio between the driving ring gear and the driving sun gear without changing the driving ring gear and the driving sun gear. As many identical parts as possible are to be used for the different instances of application.

The change in the transmission ratio is carried out only by using different planet gears provided with different radii in the region of the meshing engagement with the driving ring gear and driving sun gear. By using different planet gears with different radii for the meshing engagement at the driving ring gear and driving sun gear, the pitch circle of the planet gear bearing support at the planet gear carrier is also changed. For this reason, the planet gear carrier comprises at least two planet gear bearings located on different pitch circles. Depending on the required transmission ratio, the corresponding planet gear can be mounted at the planet gear bearing already provided on the planet gear carrier. In this regard, the planet gear bearings with the different pitch circles can be prefabricated during the production of the planet gear carrier. But it is also possible to provide merely the position of the different planet gear bearings, for example, by center-punching or some other type of marking, and then to form the corresponding bearings when needed. However, the planet gear bearings with the different pitch circles can also be provided in finished condition in the planet gear carrier so that a bearing pin need only be inserted into the corresponding planet gear bearing and the planet gear mounted on it. The bearing support of the planet gear on the base element is considered particularly economical. For example, a bearing pin is fastened to the base element. This can be accomplished by a welding method, by riveting, or by screwing. This enumeration of fastening methods should not be considered exhaustive. Any known method for fastening a bearing pin to a base element can be used. Further, the one-sided bearing support allows planet gears to be changed quickly and, therefore, inexpensively.

In one embodiment, the coupling arrangement comprises a first input portion and a second input portion into which torques guided via the first torque transmission path and second torque transmission path are introduced, and a superposition unit in which the introduced torques are combined again, and an output part which conveys the combined torque, for example, to a friction clutch or automatic transmission. The first input portion is connected in operative direction thereof to the phase shifter arrangement on one side and to the superposition unit on the other side. The second input portion is connected in operative direction thereof to the input region on one side and to the superposition unit on the other side. The superposition unit is in turn connected in operative direction thereof to both the first input portion and second input portion on one side and to the output portion on the other side. The output portion forms the output region and, in an advantageous embodiment, can receive a friction clutch.

To achieve the phase shift in a simple manner in one of the torque transmission paths, it is suggested that the phase shifter arrangement include a vibration system with a primary side and a secondary side which is rotatable with respect to the primary side around the axis of rotation A against the action of a spring arrangement. A vibration system of this type can be constructed as a kind of vibration damper, known per se, in which the resonant frequency of the vibration system can be adjusted in a defined manner, particularly by influencing the primary-side mass and secondary-side mass as well as the stiffness of the spring arrangement, and the frequency at which there is a transition to the supercritical state can accordingly also be determined.

In one embodiment, the base element can comprise at least two planet gear bearing regions, the planet gear bearing regions have at least two planet gear bearing locations in each instance, and every planet gear bearing region has at least one planet gear bearing location with an identical pitch circle diameter. The advantage in providing the planet gear bearing locations in particular planet gear bearing regions is that when using different planet gears with different pitch circles for the bearing support at the planet gear carrier the intermediate spaces between the planet gear bearing regions can be utilized for installing other components. Therefore, the oscillation area for all of the planet gears having different pitch circles for bearing support can be determined beforehand and, consequently, the remaining free space that is not in use for the oscillation area of the planet gears can be used for other component parts or components.

In one embodiment, the planet gear carrier comprises at least two segment regions adjoining the planet gear bearing regions. The segment regions can be utilized to apply stiffening in the form of beads, and accordingly to increase a basic stiffness of the base element of the planet gear carrier.

One embodiment provides that at least the two segment regions comprise in each instance an outer segment region at the radially outer area thereof, these outer segment regions being arranged at an angle to the respective segment region. A greater stiffness of the base element is achieved by this angled arrangement of the outer segment region. The outer segment region can be shaped at various angular degrees with respect to the segment region. This process can be carried out economically through a pressing process or through any other shaping method.

One embodiment, the planet gear carrier comprises a base element and a supporting element formed from the base element, the base element and supporting element are axially spaced apart from one another, and the planet gear is positioned within the axial spacing and rotatably mounted at the base element and at the supporting element. This embodiment form can be produced by a shaping process in a particularly economical manner. For example, the segment region can be shaped by a shaping process such that the segment region is at an axial distance parallel to the planet gear bearing region at the base element and is accordingly formed as supporting element. The different planet gear bearing locations can advantageously be arranged so as to be aligned after the shaping process.

In one embodiment, the planet gear carrier comprises at least one base element and a supporting element connected to one another so as to be fixed with respect to rotation around the axis of rotation A, the base element is axially spaced apart from the supporting element, and the planet gear is received within the axial spacing so as to be rotatably mounted at the base element and at the supporting element. The base element and supporting element can be connected to one another by a welding process, riveting, screws, or by any other comparable process. A high stiffness is achieved by the welding process. By joining with screws, the planet gear can be changed subsequently if required without destroying the planet gear carrier. In this case also, the planet gear bearing locations can advantageously be arranged after connecting the base element and supporting element to achieve a highly accurate alignment of the planet gear bearing locations. The base element and supporting element can be formed symmetrically, which means the different component parts are reduced as is shown in FIG. 18, or two different component parts can also be used as is shown in FIG. 13.

In a further advantageous embodiment form, the planet gear comprises a first toothing segment and a second toothing segment, and the first toothing segment and second toothing segment rotate around the same axis of rotation B. The radius around the axis of rotation B of the first toothing and second toothing can be identical or different. This is determined depending on the required transmission ratio. Further, the toothing segment can be formed only to the extent that meshing can be made possible across the existing oscillation area. This embodiment saves on weight and reduces costs for producing the teeth. Accordingly, by using planet gears with different toothing segment radii, the transmission ratio in the planetary gear set can be changed, although the driving ring gear and driving sun gear, for example, have not been altered. This is particularly advantageous because the planetary gear set can be adapted to the needs of the customer with few changes and inexpensively, since more identical parts can be used in different planetary gear transmission ratios. Consequently, because of the prefabricated different planet gear bearing locations for the planet gears at the planet gear carrier, an individual planet gear carrier can also be used with a plurality of different, already prefabricated planet gear bearing locations for different planet gears. In this way, a modular system can be produced with as many identical parts as possible, but can nevertheless be adapted to the various transmission requirements in the planetary gear set and, therefore, in the coupling gear unit.

A further advantageous embodiment form is characterized in that the first toothing segment and the second toothing segment of the planet gear lie on a plane. This embodiment form can be produced in a particularly economical way. As was just mentioned, the teeth can be constructed only for the needed oscillation area. The area freed by the omission of toothing segments can be utilized by other component parts for a space-saving type of construction.

A further advantageous configuration provides that the first toothing segment and the second toothing segment of the planet gear are axially offset with respect to one another. This embodiment of the planet gear makes it possible to gain axial installation space for other component parts in the region of the planet gear.

BRIEF DESCRIPTION OF THE DRAWINGS

Preferred embodiment examples of the invention will be described in the following with reference to the accompanying drawings.

FIG. 13 is a planet gear carrier from FIG. 11 welded together with a supporting element from FIG. 12;

FIG. 14 is a planet gear carrier as in FIG. 10;

FIG. 15 is a planet gear carrier as in FIG. 10 but in section AA;

FIG. 16 is a supporting element which is constructed symmetrical to the planet gear carrier from FIG. 14;

FIG. 17 is a supporting element as in FIG. 16, but in section BB;

FIG. 23 is a planet gear carrier as in FIG. 10, but with beads for producing a rivet joint with a supporting element;

FIG. 24 is a planet gear carrier as in FIG. 23, but in section AA; and

DETAILED DESCRIPTION OF THE PRESENTLY PREFERRED EMBODIMENTS

Figure 1:
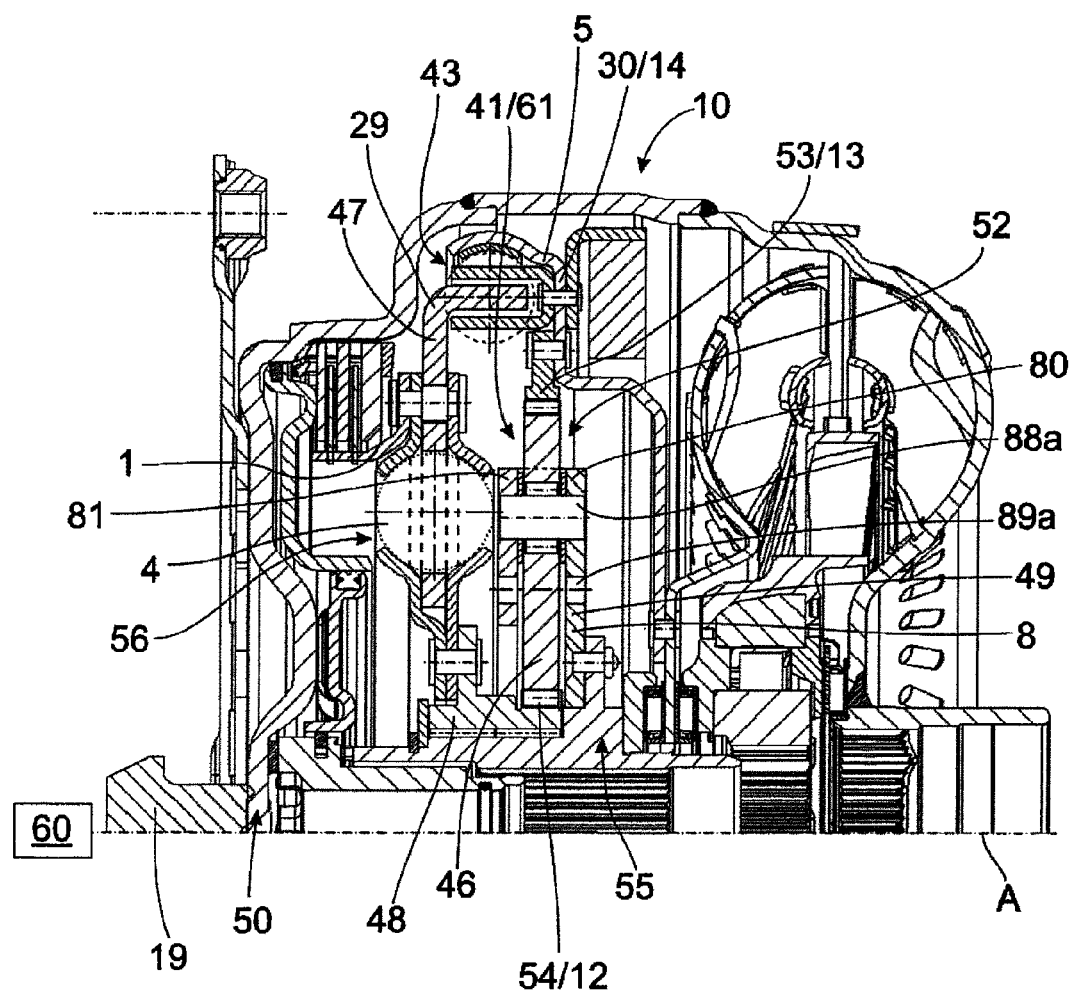
FIG. 1 is a torsional vibration damping arrangement with a converter clutch and a hydrodynamic torque converter.
Figure 1A:
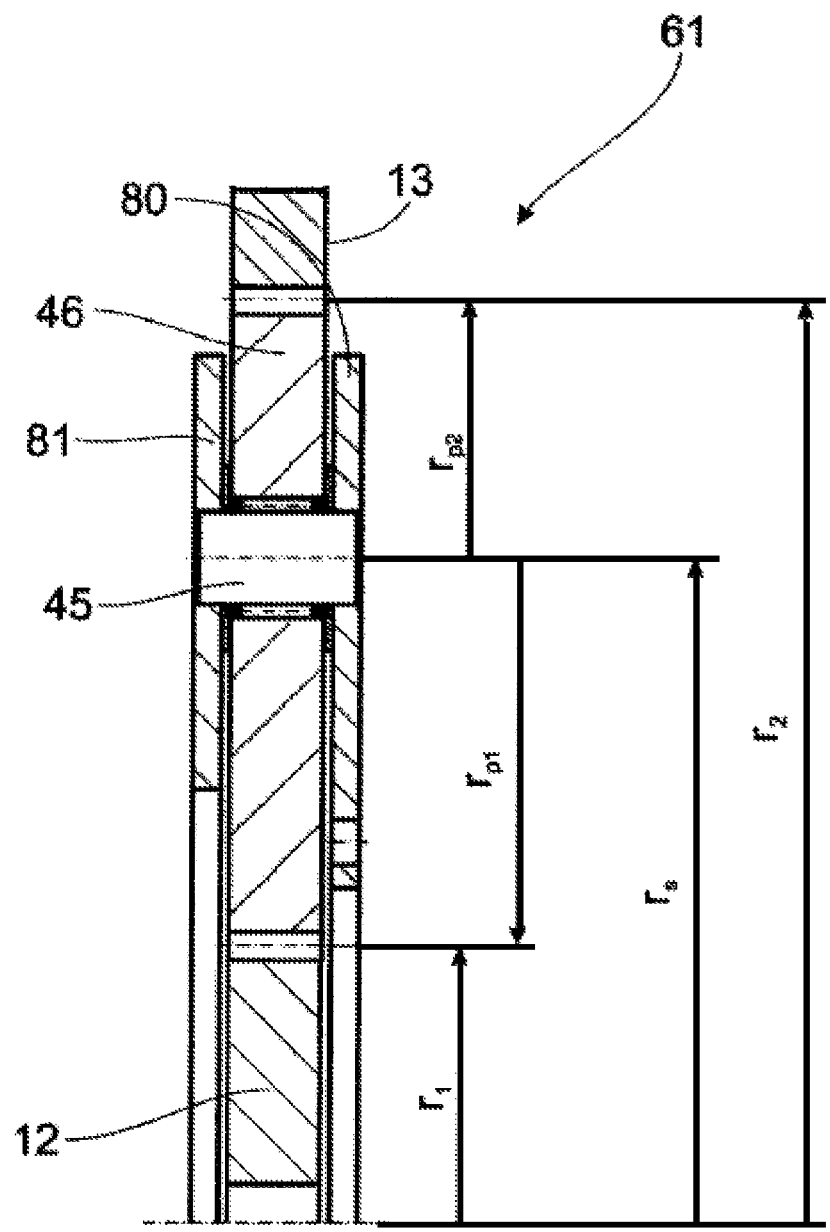
FIG. 1a is a detail of the planetary gear set 61.

FIG. 1 shows a torsional vibration damping arrangement 10 rotatable around axis of rotation A and which operates on the principle of power splitting or torque splitting. FIG. 1 shows a primary mass 1, a spring arrangement 4, an intermediate element 5, secondary mass 14, crankshaft 19, input element 29, output element 30, phase shifter arrangement 43, superposition unit 52, output region designated generally by 55, and vibration system 56. The torsional vibration damping arrangement 10 is arranged between a drive unit 60 and an automatic transmission, not shown. The torsional vibration damping arrangement 10 comprises an input region, designated generally by 50. In the input region 50, the torque received from the drive unit 60 branches into a first torque transmission path 47 and a second torque transmission path 48. In the region of a coupling arrangement which is designated generally by reference numeral 41 and is formed in this instance by a planetary gear set 61 with a planet gear 46, the torque components which are guided via the two torque transmission paths 47, 48 are introduced into the coupling arrangement 41 by a first input part 53, formed in this instance by a driving ring gear 13, and a second input part 54, formed in this instance by a driving sun gear 12, and are combined again therein. The planet gear 46 meshes with the driving sun gear 12 on the one hand and with the driving ring gear 13 on the other hand. The planet gear 46 is rotatably supported on a planet gear carrier 8. The planet gear carrier 8 forms an output part 49 that can be connected to the transmission input shaft, not shown here. Planet gear bearing locations 88a and 89a are already provided at the planet gear carrier 8 in order to receive different planet gears with different pitch circles for the planet gear bearing locations. Of course, it is possible that only one type of planet gear can be installed. In FIG. 1, a planet gear is installed on planet gear bearing location 88a. A stationary gear ratio for the planetary gear set 61 results from the radius ratios of the gearwheels as can be gathered from FIG. 1a.

This is expressed as $$i_{12} = \frac{-r_2 \cdot r_{P1}}{r_1 \cdot r_{P2}}, \qquad (I)$$

where $r_1$=radius of driving sun gear 12, $r_2$=radius of driving ring gear 13, $r_{P1}$=radius of planet gear 46 to driving sun gear 12, $r_{P2}$=radius of planet gear 46 to driving ring gear 13, and $r_S$=web radius.

Further, since the planet gears 46 are located between the driving sun gear 12 and the driving ring gear 13:

$$r_2 - r_1 = r_{P1} + r_{P2} \qquad (II)$$

$$r_S = r_1 + r_{P1} \qquad (II)$$

Therefore, a change in the transmission ratio in the planetary gear set can be achieved through a change in each of the radii in equation (I), but the conditions in equations (II) and (III) must be met. The invention is based on changing as few parts as possible for changing the transmission ratio. For this reason, only the radii of the planet gears 46 meshing with the driving sun gear 12 on the one hand and with the driving ring gear 13 on the other hand are changed. The radii of the driving sun gear 12 and driving ring gear 13 remain the same.

The invention is shown here only by way of example at a powertrain unit with a converter clutch and a hydrodynamic torque converter. But the invention can also be arranged in a unit with a conventional shift transmission or in any other known arrangement between a drive unit and a start-up element.

Figure 2:
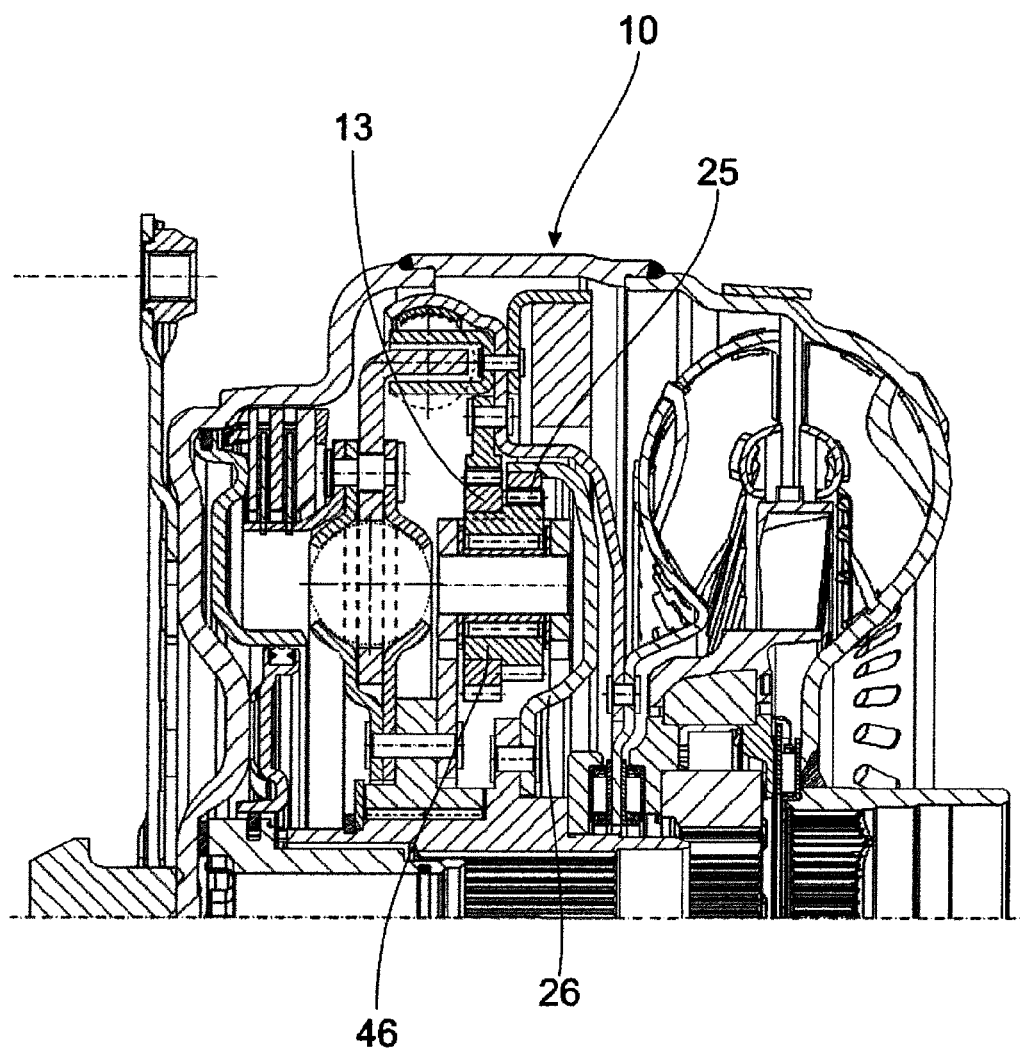
FIG. 2 is a torsional vibration damping arrangement as in FIG. 1, but with a driven ring gear as output of the coupling arrangement.

FIG. 2 shows a torsional vibration damping arrangement 10 as in FIG. 1, but with a different shifting variant of the planetary gear set 61. In this case, the output from the coupling arrangement is effected via a driven ring gear 25 connected to the driven ring gear carrier 26 so as to be fixed with respect to rotation relative to it. The planet gear is provided with two toothing segment diameters which are axially offset. But the invention is also applicable to this shifting variant. For changing the transmission ratio, the driving ring gear 13 and the driven ring gear 25 remain the same and only a changed planet gear 46 is required. As has already been described referring to FIG. 1, a different planet gear 46, in this case with changed toothing diameters which mesh with driving ring gear 13 and driven ring gear 26, is merely installed on a different pitch circle diameter at the planet gear carrier 8.

Figure 3:
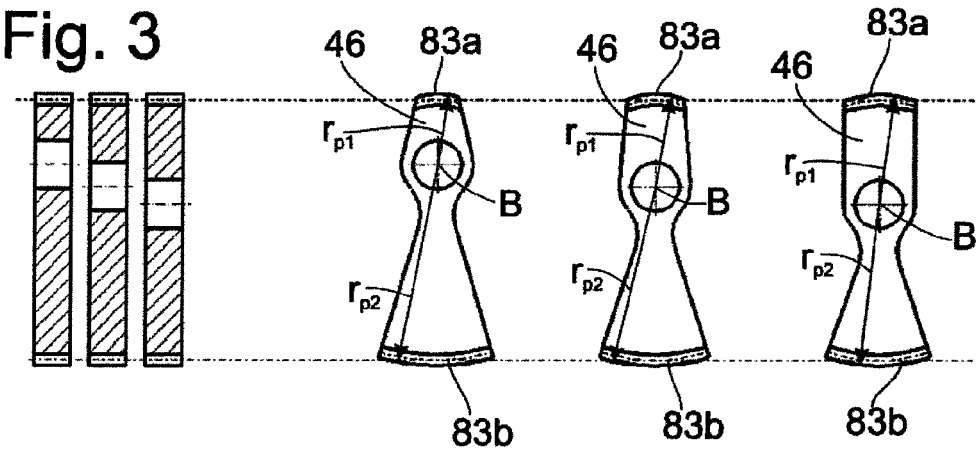
FIG. 3 shows three planet gears with different toothing segment radii.

FIG. 3 shows three planet gears with different segment radii $r_{P1}$ and $r_{P2}$. Due to the different segment radii, the transmission ratio in the planetary gear set can be changed while the driving sun gear and driving ring gear remain the same. Toothing segment 83a, which meshes with the driving ring gear, and toothing segment 83b, which meshes with the driving sun gear, lie on a plane. In the construction of the planet gears shown here, the toothing segments 83a and 83b are only constructed to the extent that a reliable meshing is ensured at the maximum oscillation angle of the planet gear. In this way, weight can be saved and the planet gears can be produced more economically.

Figure 4:
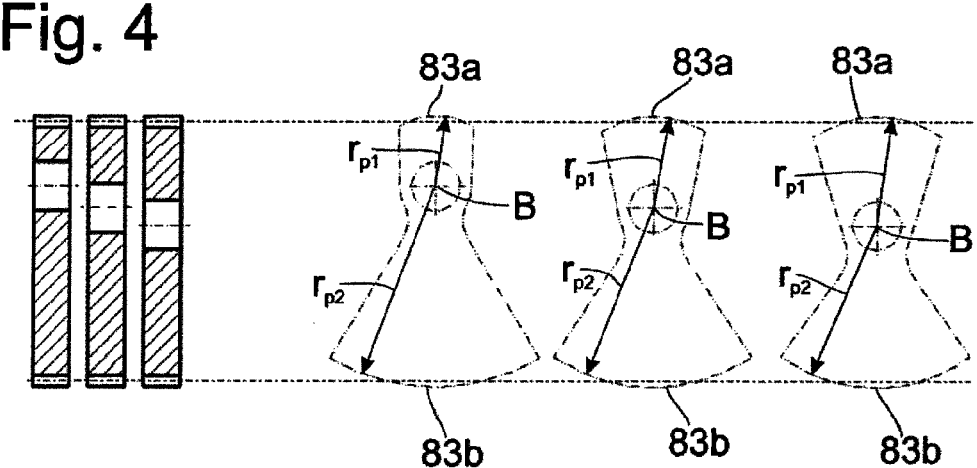
FIG. 4 shows three planet gears as in FIG. 3, but with larger toothing dimensions.

FIG. 4 shows three planet gears as in FIG. 1, but with a longer toothing dimensioning. This allows a larger oscillation angle of the planet gear. Different segment radii are also provided in this case to allow the transmission ratio to be changed while retaining the driving ring gear and driving sun gear.

Figure 5:
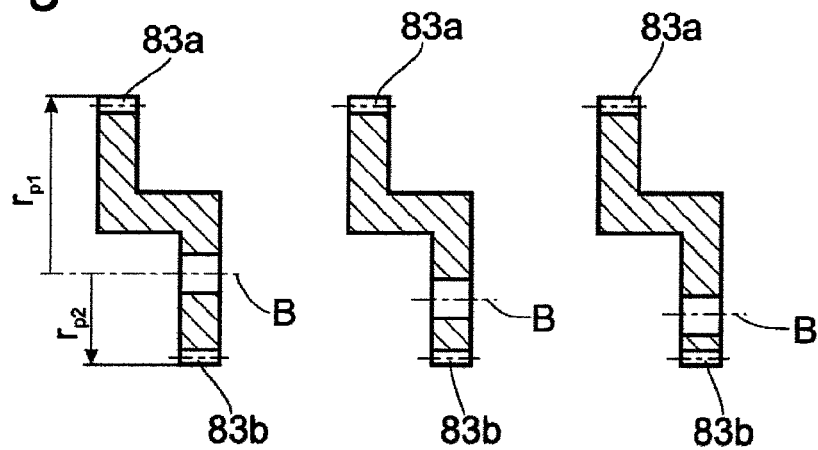
FIG. 5 shows three planet gears with, in each instance, toothing segments which are axially offset with respect to one another.

FIG. 5 shows three planet gears with different segment radii $r_{p1}$ and $r_{p2}$ as is shown in FIG. 3 or 4, but with axially offset toothing segments 83a and 83b. In this way, axial installation space can be gained for other component parts in the region of the planet gear 46.

Figure 6:
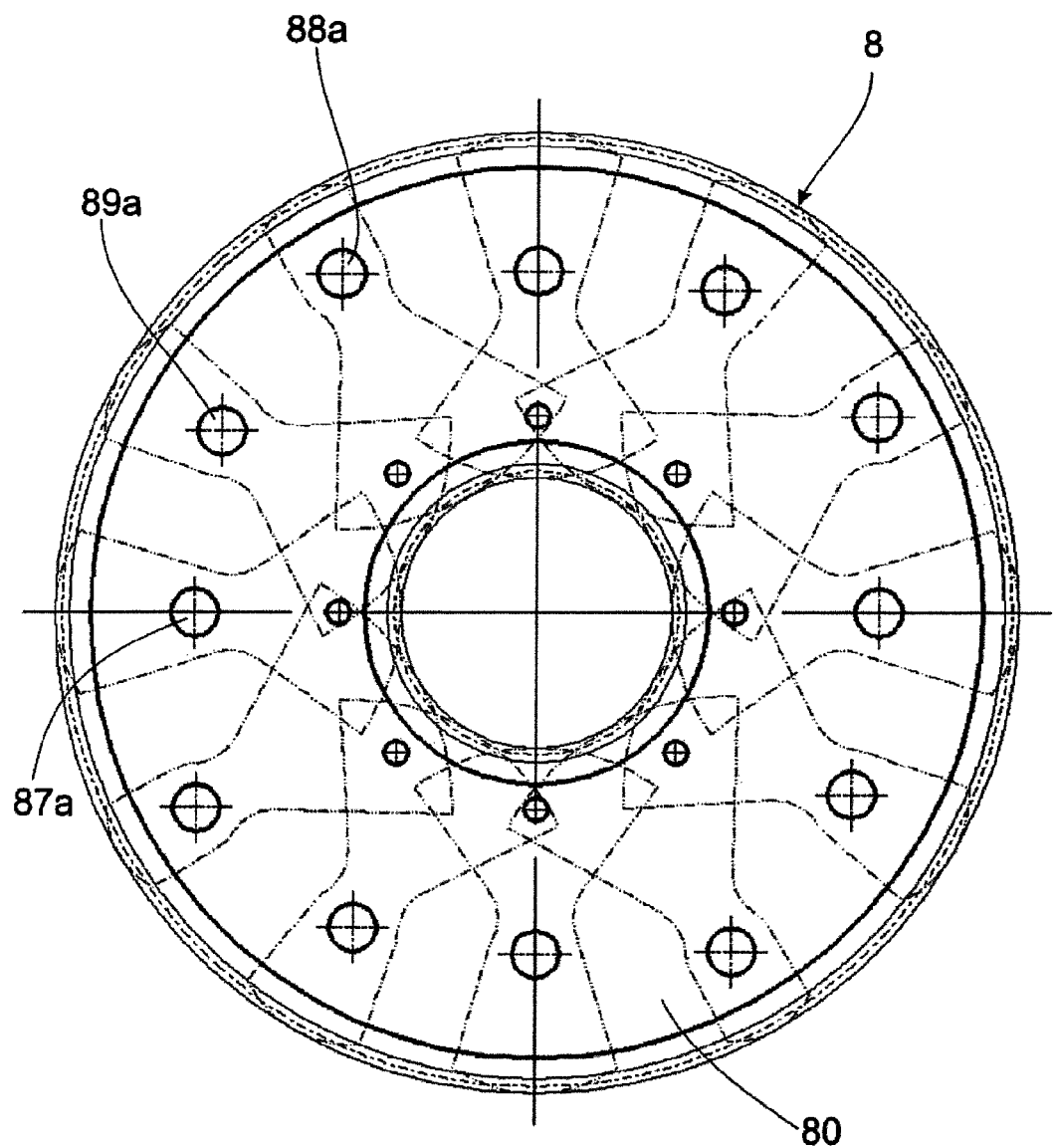
FIG. 6 is a planet gear carrier with different bearing bore holes for the planet gears.

FIG. 6 shows a base element 80 of the planet gear carrier 8 with a special bore hole pattern for the planet gear bearing locations on which the planet gears are mounted. In order that the planet gear carrier 8 can be used, for example, for the different transmission ratios of the planet gears illustrated in FIGS. 3, 4 and 5, bore holes which are distributed along the circumference are arranged on the different pitch circles for the different positions of the planet gear bearing locations, for example, 87a, 88a, 89a. However, the different planet gear bearing locations for the planet gears can also merely be indicated beforehand, not shown, by center-punching or some other type of marking. When the corresponding planet gear is used, the actual bore hole for the planet gear bearing location can then be made. The planet gear carrier 8 is designed for up to four planet gears, but a different quantity would also be possible. The oscillation areas of the planet gears are shown over the respective bore holes for the planet gear bearing locations. Of course, it is also possible to install planet gears with the same pitch circle for the planet gear bearing locations. If only the base element 80 shown here is used as planet gear carrier 8, the planet gears 46 are one-sidedly rotatably mounted at the planet gear bearing locations, for example, planet gear bearing location 89a. This embodiment form is inexpensive and the planet gears can be mounted easily.

Figure 7:
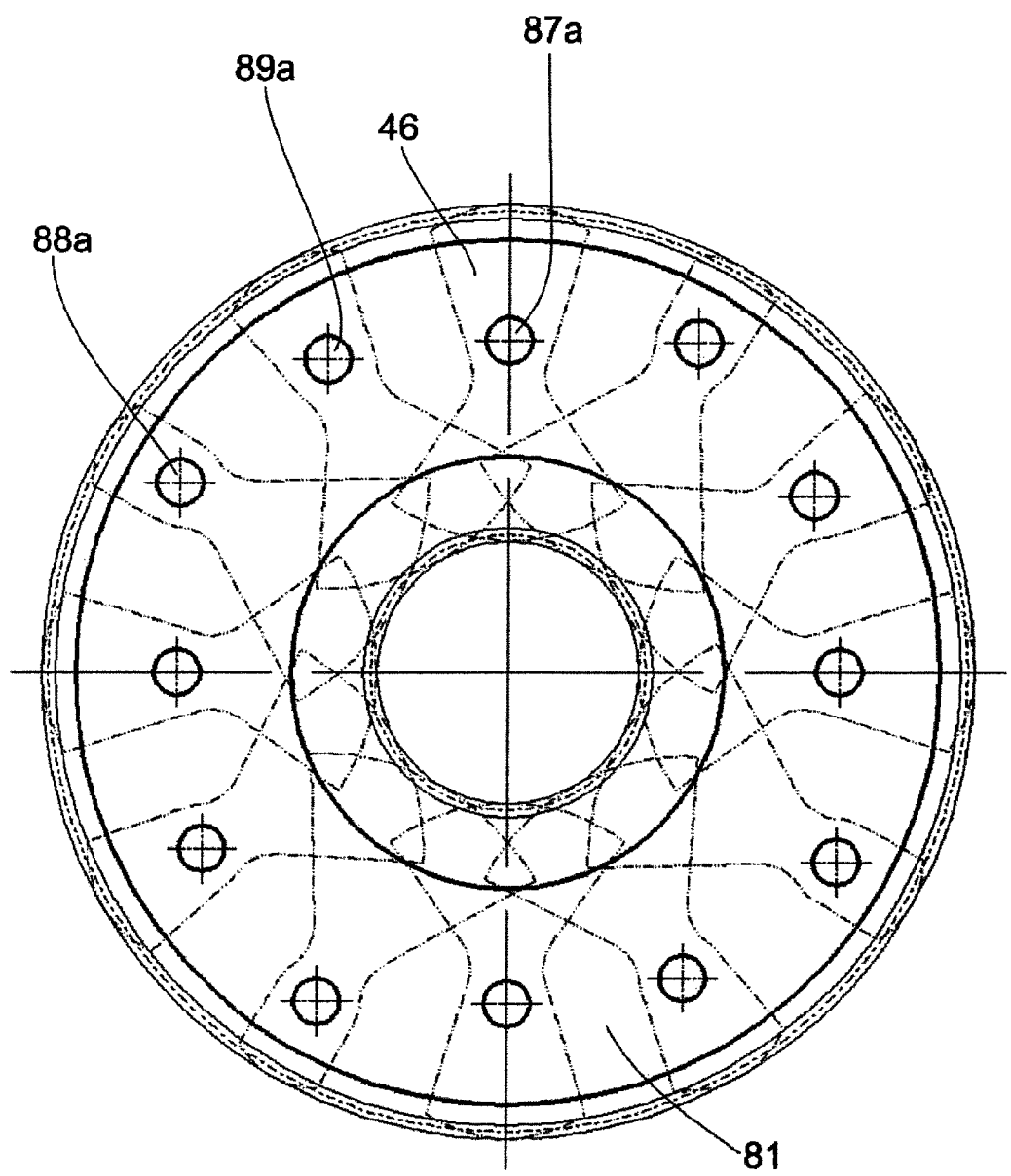
FIG. 7 is a supporting element for the planet gear carrier from FIG. 6.

FIG. 7 shows a supporting element 81 that fits the base element 80 shown in FIG. 6. The supporting element has an equivalent bore hole pattern for the planet gear bearing locations, for example, planet gear bearing location 87a, 88a, 89a, with respect to the base element 80 and makes it possible to mount a planet gear 46 on both sides. This is particularly advantageous if higher torques are to be transmitted. This prevents a slanting of the planet gear 46, reduces wear on the teeth and prolongs operating life.

Figure 8:
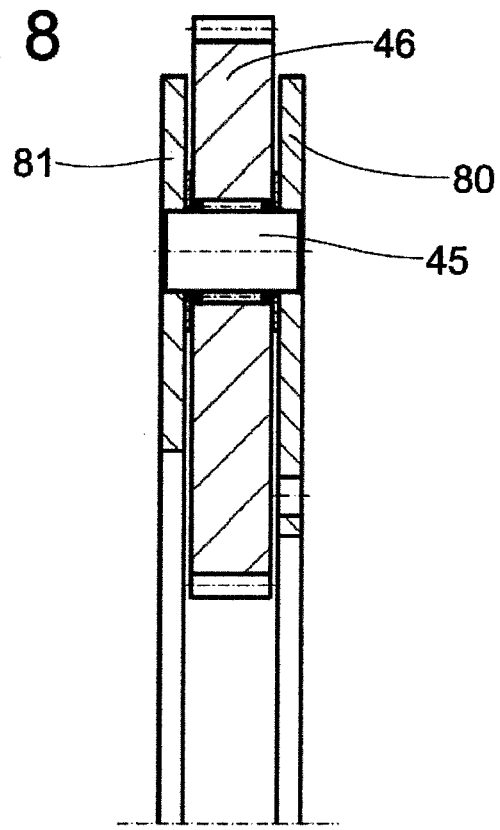
FIG. 8 is a planet gear carrier with supporting element and mounted planet gear in section.
Figure 9:
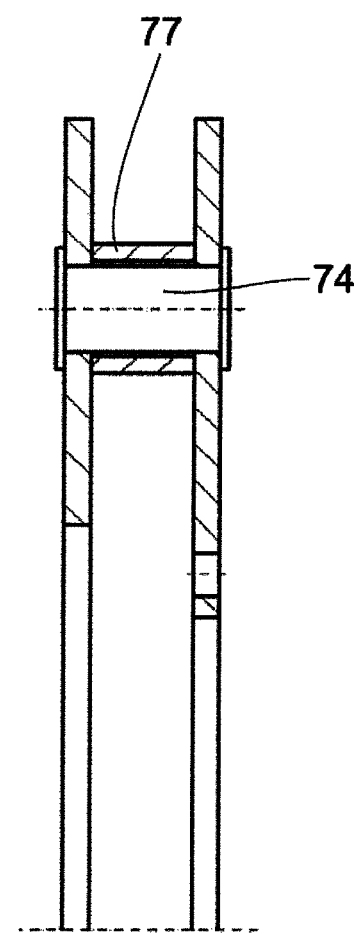
FIG. 9 is a planet gear carrier as in FIG. 8, but with a spacer sleeve on the bearing pin.

FIG. 8 shows the assembly of base element 80 with supporting element 81 and a planet gear 46 and the bearing support thereof. In the construction presented here, always only the bore holes of a transmission ratio are used for the bearing pins 45 of the planet gears during assembly. Therefore, the rest of the bore holes can be utilized for making a connection with the supporting element. To adjust the required spacing of the two parts of the planet gear carrier, either a rivet 74 with a corresponding step or a spacer piece 77 are used. A solution with spacer piece 77 is shown in FIG. 9.

In order to achieve an exact alignment of the bore holes of a bearing pin in the base element and supporting element with respect to one another, the latter can also be finished jointly in a clamping only after the two parts have been connected. This would mean that the bore diameters in the parts prior to assembly would be smaller than the diameter of the bearing pin, but preferably already have the correct diameter for the rivet connection. Screw connections, weld connections or any other type of fastening known for this application are also possible.

Figures 10, 11:
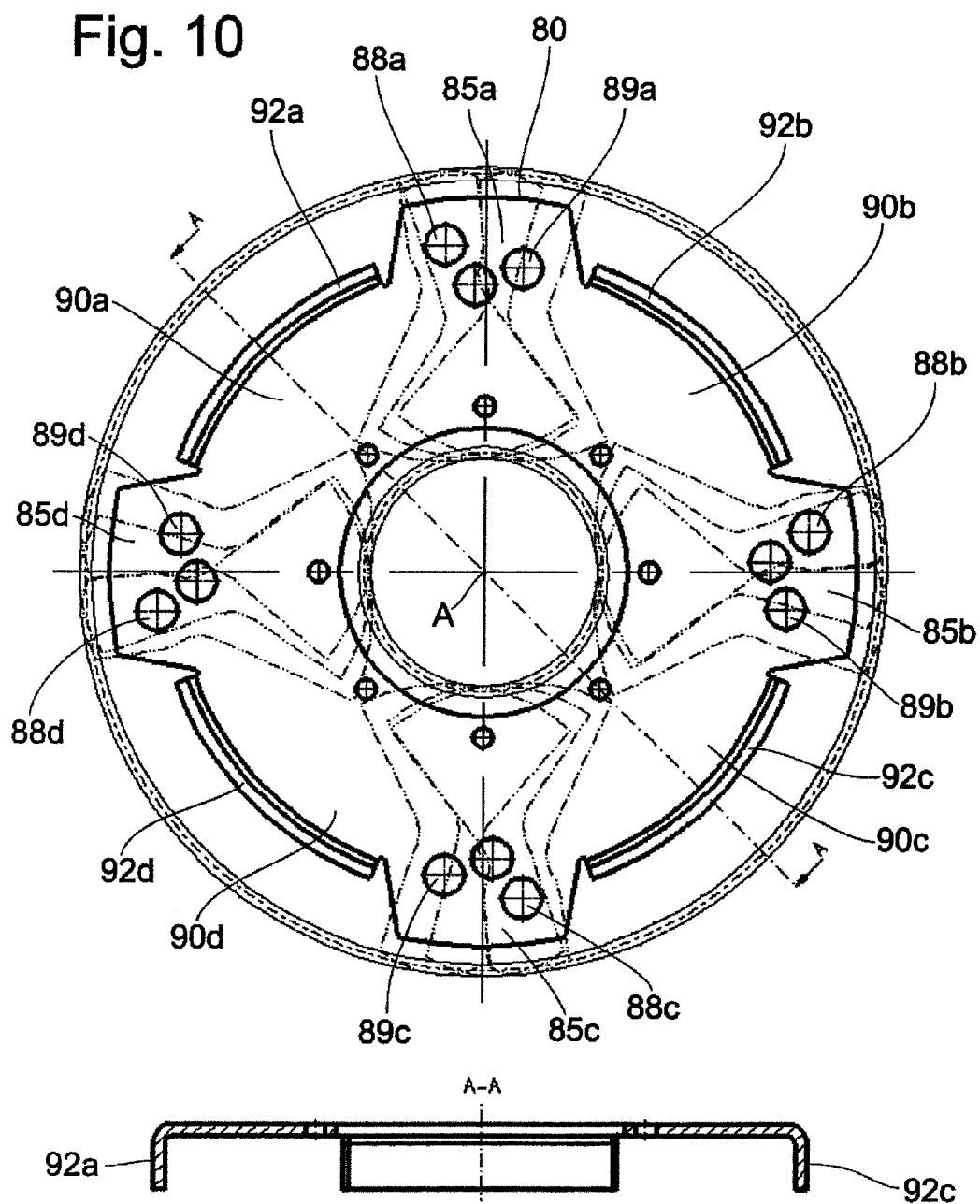
FIG. 10 is a planet gear carrier with planet gear bearing regions and angled outer segment regions.
FIG. 11 is a planet gear carrier as in FIG. 10, but in section.

FIG. 10 shows a base element 80 of an alternative embodiment in which the segment regions 90a, 90b, 90c, 90d have outer segment regions 92a, 92b, 92c, 92d which are angled. A supporting element, not shown here, can be welded at these angled outer segment regions 92a, 92b, 92c, 92d, for example. However, it is also possible to utilize these angled segment regions as stiffening for the base element. In the variant presented in FIG. 6 in which the bore holes for the different planet gears are uniformly distributed over the circumference, this would not be possible in a meaningful manner because only very little space would remain between the oscillation areas of the planet gears for the angled segment regions.

The bore holes for the planet gear bearing locations of different transmission ratios are moved spatially close together in the region of planet gear bearing regions such as 85a, 85b, 85c, 85d, and larger gaps are accordingly formed between the oscillation areas of the planet gears which can be utilized for the segment regions 92a, 92b, 92c, 92d. The latter are staggered such that they lie in a smallest possible angular area but nevertheless have web widths of the requisite strength therebetween. It is not important that the oscillation areas of the different planet gear constructions overlap because always only planet gears of one gear ratio are actually mounted. In the variant shown in FIG. 10, the angled segment regions 92a, 92b, 92c, 92d are located on approximately the same radius as the bore holes for the planet gear bearing locations.

FIG. 11 shows a section AA of the base element 80 from FIG. 10 in which the angled outer segment regions 92a and 92c are clearly shown. The angling shown here is not mandatory. However, it is well suited, for example, for welding on an equivalent supporting element, not shown.

Figure 12:
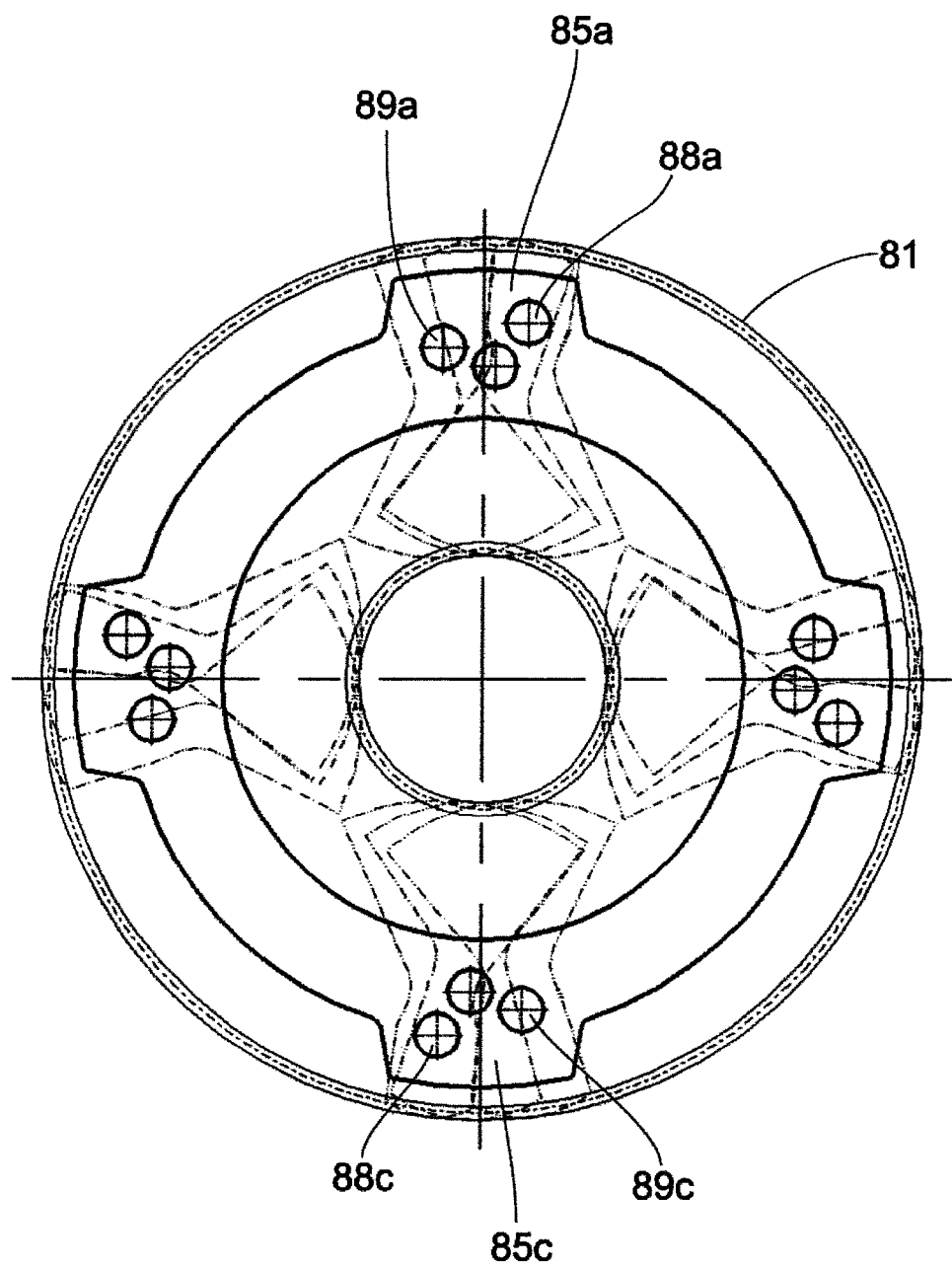
FIG. 12 is a supporting element for the planet gear carrier in FIG. 11.

FIG. 12 shows a supporting element 81 formed with bore holes equivalent to the base element 80 from FIG. 10. This variant of the supporting element 81 has no angled outer segment regions. However, it can also be produced with these angled outer segment regions. This depends inter alia on the size of the spacing between the base element 80 and the supporting element 81.

FIG. 13 shows in section AA the base element 80 from FIG. 11 connected to the supporting element from FIG. 12 so as to be fixed with respect to rotation relative to it by a weld seam 37.

FIG. 14 shows a base element 80 of a planet gear carrier 8 which is identical to the supporting element 81 shown in FIG. 16 except for the mirror-inverted arrangement of the planet gear bearing locations, for example, 87a, 87b, 87c, 87c and 88a, 88b, 88c, 88d and 89a, 89b, 89c, 89d. The angled outer segment regions 92a, 92b, 92c, 92d of the base element and supporting element are likewise identically constructed so as to provide the lowest possible manufacturing expenditure with as many identical parts as possible, which has a positive outcome on production costs.

FIGS. 15 and 17, respectively, show the base element 80 from FIG. 14 and the supporting element 81 from FIG. 16 in section AA.

Figure 18:
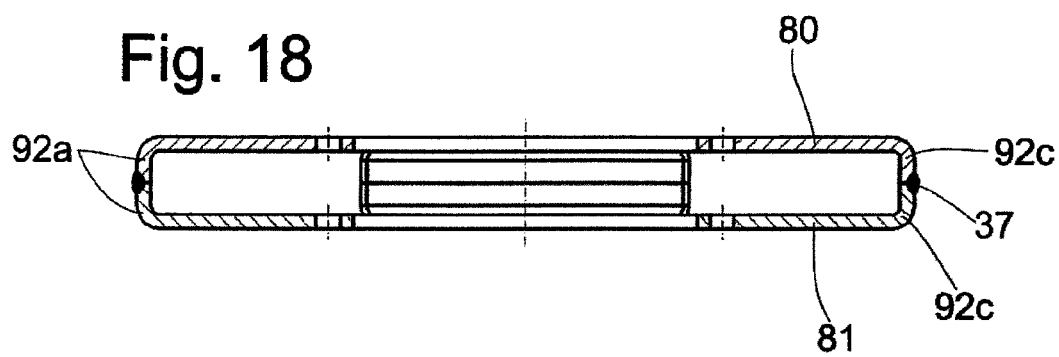
FIG. 18 is a welded constructional unit of planet gear carrier as in FIG. 14 and supporting element as in FIG. 16.

FIG. 18 shows a base element 80 from FIG. 14 connected to a supporting element 81 from FIG. 16 in the region of the angled outer segment regions 92a and 92c by a weld seam 37 so as to be fixed with respect to rotation relative to it.

Figure 19:
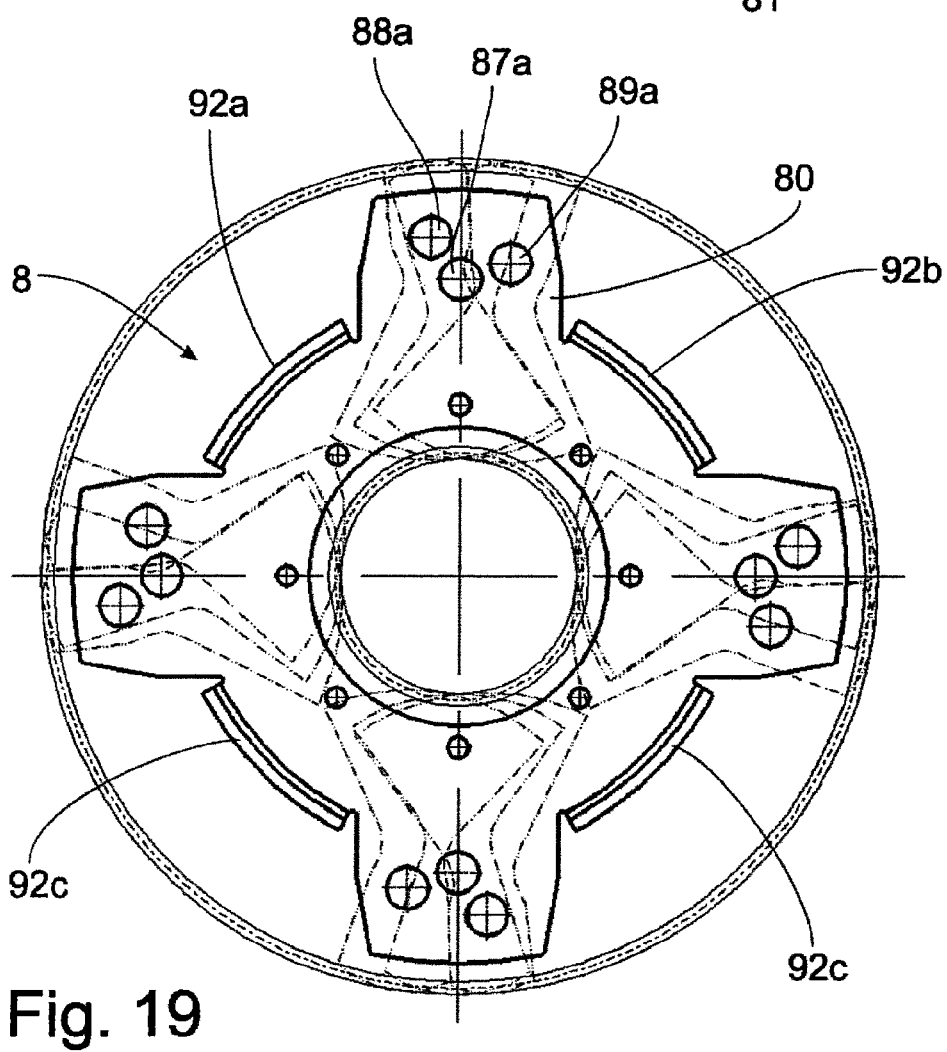
FIG. 19 is a planet gear carrier as in FIG. 10, but with angled outer segment regions located on a smaller pitch circle than the planet gear bearing locations of the planet gears.

FIG. 19 shows a construction similar to FIG. 10, but in which the angled outer segment regions 92a, 92b, 92c, 92d are arranged on a smaller pitch circle than the bore holes for the planet gear bearing locations, for example, 87a, 88a, 89a, of the planet gears such that the installation space on the radially outer side is available for other component parts and a smaller mass moment of inertia of the planet gear carrier 8 results. This constructional form is chiefly used for arrangements with relatively few planet gears (≤4) in which there is still sufficient free space outside of the oscillation area of the planet gears for sufficiently broad angled outer segment regions.

Figure 20:
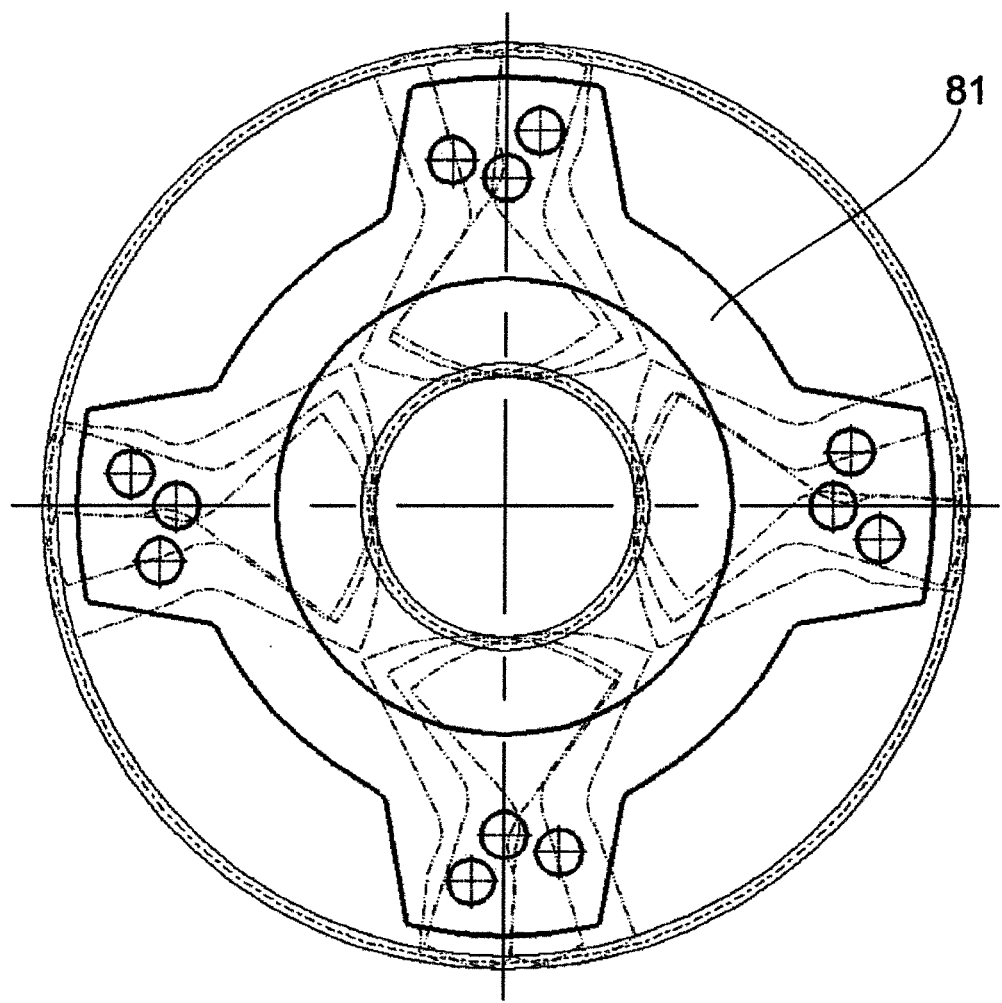
FIG. 20 is a supporting element for the planet gear carrier in FIG. 19.

FIG. 20 shows the supporting plate 81 associated with the base element 80 from FIG. 19. The supporting plate 81 is formed as a disk. Not shown here, but also possible, is the construction with angled outer segments which has already been described referring to FIG. 16.

Figure 21:
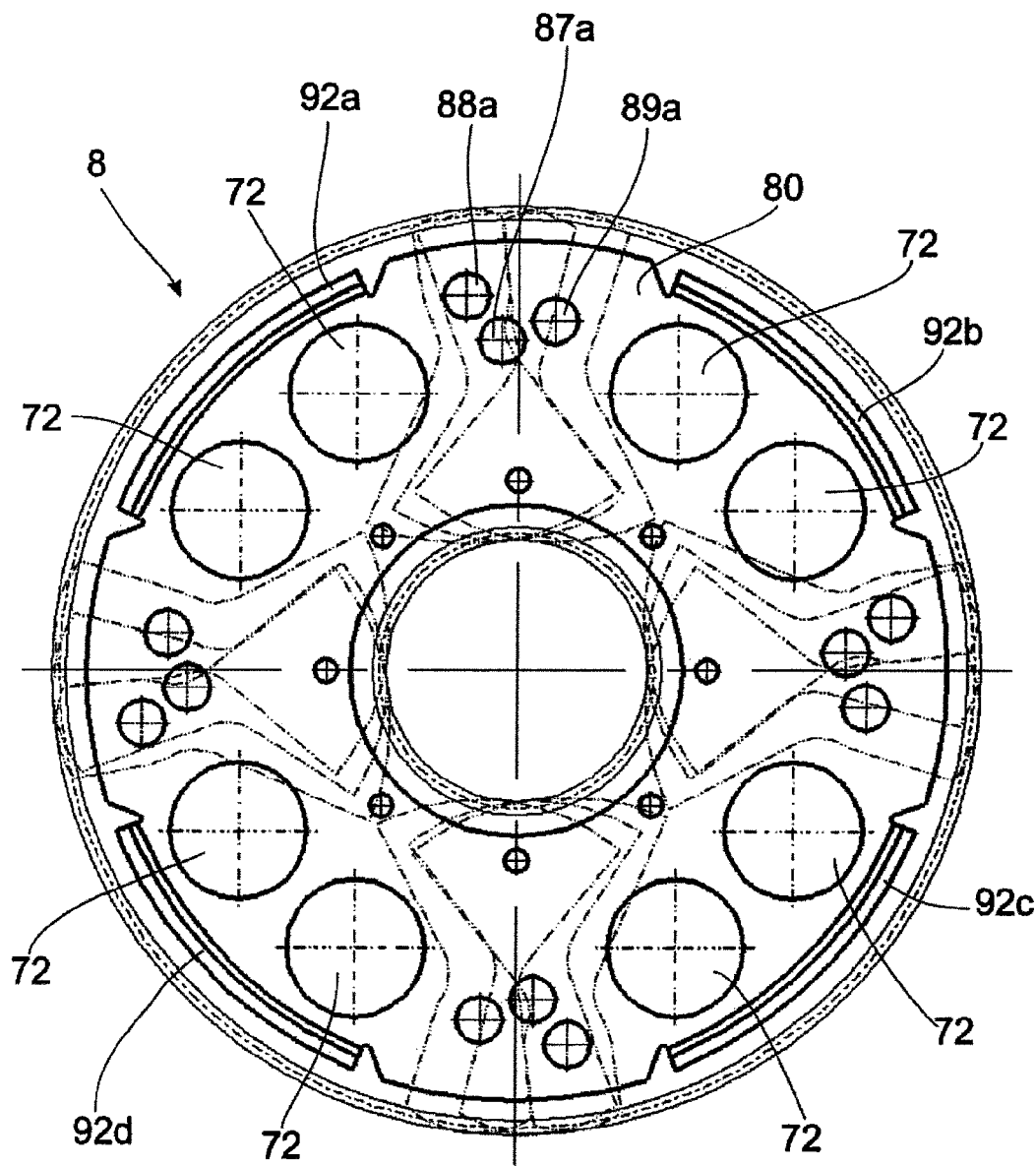
FIG. 21 is a planet gear carrier with angled outer segment regions which are located on a larger pitch circle than the planet gear bearing locations of the planet gears.

FIG. 21 shows a constructional variant of a base element 80 of a planet gear carrier 8 in which the outer angled segment regions 92a, 92b, 92c, 92d are arranged radially outside of the pitch circle of the planet gear bearing locations, for example, 87a, 88a and 89a, for the planet gears. To reduce the mass and the mass moment of inertia of the planet gear carrier 8, cutouts 72 are provided in this case radially inside of the angled outer segment regions 92a, 92b, 92c, 92d. The round shape shown here serves only as an example. The cutouts can also have any other shape. This construction is provided particularly when more planet gears are used (≥4) because in this case, in contrast to the constructional variants mentioned before, more web width remains between the individual planet gear bearing locations, for example, 87a, 88a, 89a and 87b, 88b, 89b, and the forces are smaller on a larger radius than on a smaller radius while the torque to be transmitted remains the same.

Figure 22:
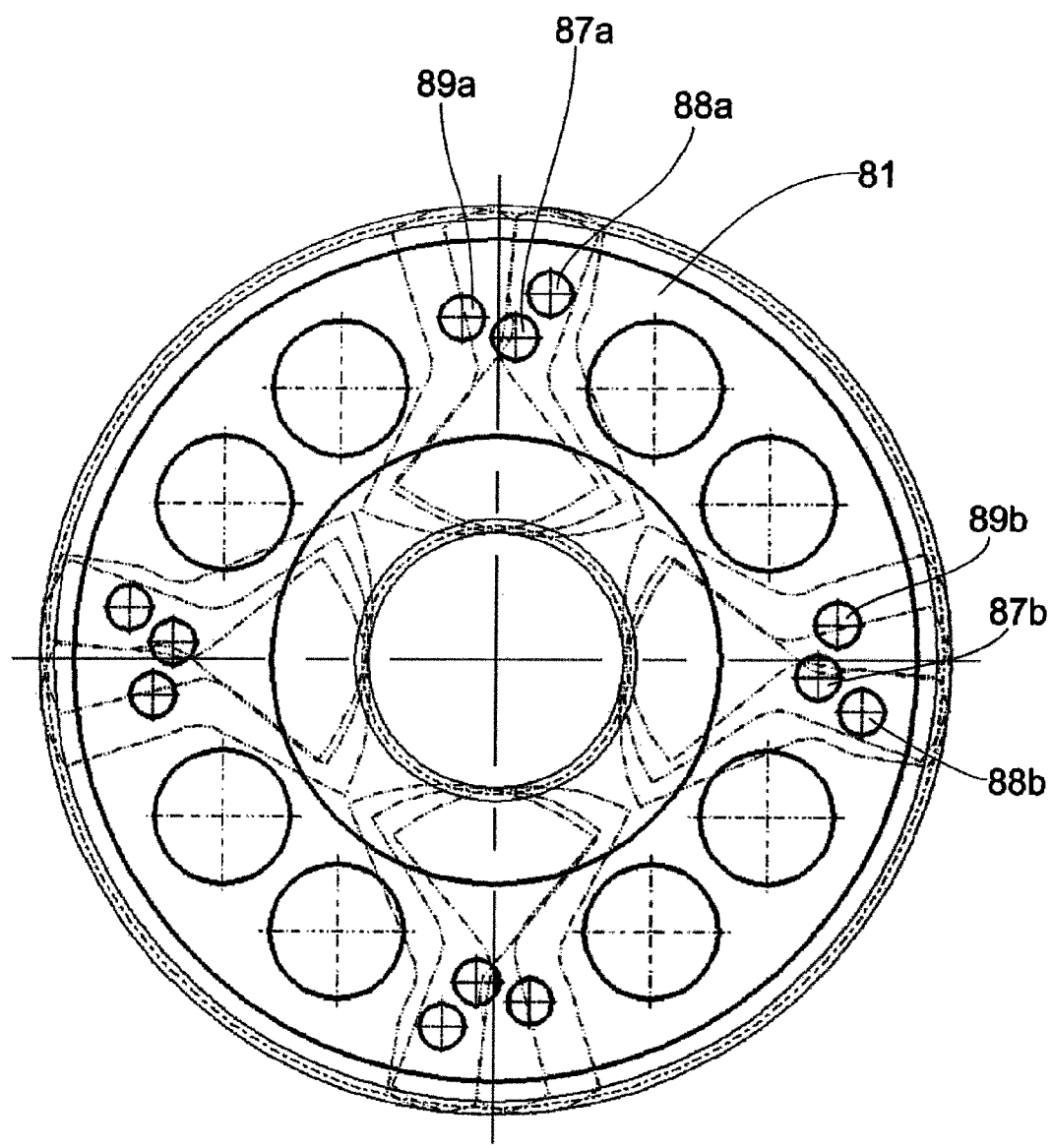
FIG. 22 is a supporting element for the planet gear carrier in FIG. 21.

FIG. 22 shows a supporting plate 81 which fits the base element 80 from FIG. 21 and which has mirror-inverted planet gear bearing locations, for example, 87a, 88a and 89a. The supporting plate 81 is shown here as a flat disk and can be connected to the base element 80 as has already been described referring to FIG. 13.

However, it is also possible, although not shown in the drawing, to form the supporting plate 81 equivalent to the base element 80 from FIG. 21 and to shape the angled outer segment regions like the base element 80. The connection of the supporting plate 81 and base element 80 can then be carried out in the manner described above referring to FIG. 18. This embodiment form is particularly economical because the base element 80 and the supporting plate 81 can be manufactured as identical parts. Only the bore holes for the planet gear bearing locations of the planet gears need be arranged in a mirror-inverted manner.

Figure 25:
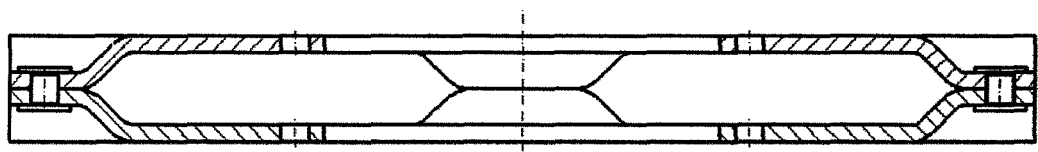
FIG. 25 is a riveted constructional unit of planet gear carrier as in FIG. 23 and supporting element which is formed symmetrical to the planet gear carrier in FIG. 23.

FIG. 23 shows a constructional variant of a base element 80 of a planet gear carrier 8 which is shaped for a rivet connection and/or screw connection with a supporting element, not shown here. To this end, beads 78 with which the necessary distance between the plates is adjusted are incorporated preferably in the radially outer areas of the segment regions 90a, 90b, 90c, 90d. Depending on the depth of the bead, a flat supporting element, not shown here, can be riveted or screwed to the base element 80 in the area of the beads. But it is also possible to fashion a supporting plate equivalent to the base element 80 such that they are connected so as to be fixed with respect to relative rotation by means of a rivet joint as is shown in FIG. 25. This embodiment form is particularly advantageous, since the base element 80 and the supporting element 81 are identically constructed with the exception of the mirror-inverted bore holes for the planet gear bearing locations of the planet gears.

FIG. 24 shows the base element 80 from FIG. 23 in section with the shaped bead 78.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damping arrangement for a powertrain of a motor vehicle, comprising:
   an input configured to be driven in rotation around an axis of rotation (A);
   an output;
   a first torque transmission path;
   a second torque transmission path that proceeds from the input and parallel to the first torque transmission path;
   a coupling arrangement that communicates with the output and configured to superpose the respective torques conducted via the first torque transmission path and the second torque transmission path, the coupling arrangement comprises:
      a planetary gear set including:
         a planet gear carrier that comprises:
            a base element with a first planet gear bearing location positioned at the base element on a first pitch circle diameter and a second planet gear bearing location positioned at the base element on a second pitch circle diameter, wherein the first pitch circle diameter and the second pitch circle diameter differ from one another; and
         a planet gear mounted on the planet gear carrier; and
   a phase shifter arrangement for the first torque transmission path configured to generate a phase shift of rotational irregularities conducted via the first torque transmission path relative to rotational irregularities conducted via the second torque transmission path, the phase shifter arrangement comprises:
      an input element; and
      an output element.

2. The torsional vibration damping arrangement according to claim 1, wherein the coupling arrangement comprises:
   a superposition unit operatively connected to both a first input portion, a second input portion, and an output portion;
   the first input portion operatively connected to the output element of the phase shifter arrangement and to the superposition unit;
   the second input portion operatively connected to the input and to the superposition unit; and
   the output portion forms the output.

3. The torsional vibration damping arrangement according to claim 1, wherein the phase shifter arrangement comprises:
   a vibration system with a primary mass and an intermediate element rotatable with respect to the primary mass around the axis of rotation (A) against a force of a spring arrangement,
   wherein the intermediate element forms the output element of the phase shifter arrangement.

4. The torsional vibration damping arrangement according to claim 1,
   wherein the base element has at least two planet gear bearing regions,
   wherein the planet gear bearing regions have at least two respective planet gear bearing locations, and
   wherein every planet gear bearing region has at least one planet gear bearing location with an identical pitch circle diameter.

5. The torsional vibration damping arrangement according to claim 4, wherein the planet gear carrier comprises at least two segment regions that adjoin the planet gear bearing regions.

6. The torsional vibration damping arrangement according to claim 5, wherein at least the two segment regions comprise in each instance at a radially outer area thereof an outer segment region, these outer segment regions are arranged at an angle to the respective segment regions.

7. The torsional vibration damping arrangement according to claim 1,
   wherein the planet gear carrier comprises the base element and a supporting element,
   wherein the supporting element is formed from the base element,
   wherein the base element and supporting element are axially spaced apart from one another, and
   wherein the planet gear is positioned within the axial spacing and rotatably mounted at the base element and at the supporting element.

8. The torsional vibration damping arrangement according to claim 1, wherein the planet gear carrier comprises the base element and a supporting element connected to one another so as to be fixed with respect to rotation around the axis of rotation (A),
   wherein the base element is axially spaced apart from the supporting element, and
   wherein the planet gear is received within the axial spacing so as to be rotatably mounted at the base element and at the supporting element.

9. The torsional vibration damping arrangement according to claim 1, wherein the planet gear has a first toothing segment and a second toothing segment, wherein the first toothing segment and second toothing segment have a same axis of rotation (B).

10. The torsional vibration damping arrangement according to claim 9, wherein the first toothing segment and the second toothing segment of the planet gear lie on a plane.

11. The torsional vibration damping arrangement according to claim 9, wherein the first toothing segment and the second toothing segment of the planet gear are axially offset with respect to one another.

* * * * *